May 15, 1945.  G. B. WARREN  2,376,212
ELASTIC FLUID TURBINE ARRANGEMENT
Filed March 22, 1945
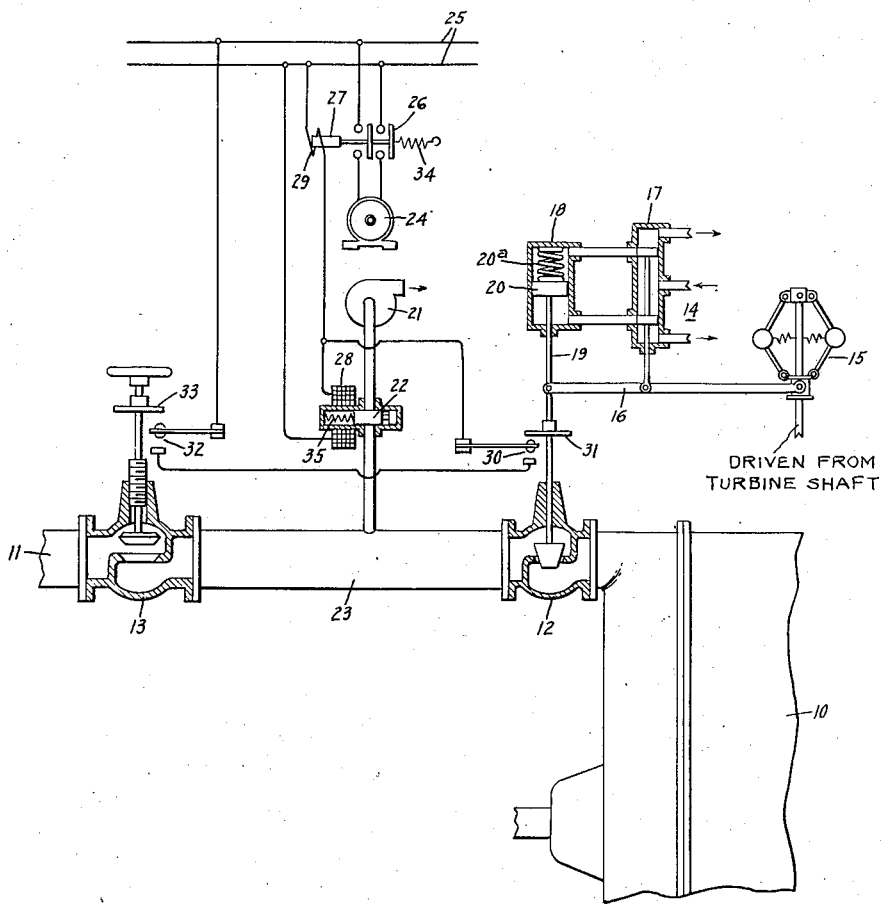
Inventor:
Glenn B. Warren,
by Harry E. Dunham
His Attorney.

Patented May 15, 1945

2,376,212

UNITED STATES PATENT OFFICE 2,376,212

ELASTIC FLUID TURBINE ARRANGEMENT

Glenn B. Warren, Niskayuna, N. Y., assignor to General Electric Company, a corporation of New York Application March 22, 1945, Serial No. 584,090

4 Claims. (Cl. 137—158)

The present invention relates to elastic fluid turbine arrangements in which a turbine or like elastic fluid engine is connected to a source of elastic fluid through a throttle valve and a stop valve. Upon shutdown it is the practice to close both the throttle valve and the stop valve. Difficulties have heretofore been experienced with arrangements of this kind upon shutdown due to leakage of elastic fluid past these valves. Leakage fluid thus admitted to the turbine may cause corrosion therein and thereby seriously impede the efficiency and the life of the turbine.

The object of my invention is to provide an improved construction of elastic fluid turbine or engine arrangements whereby leakage of fluid into the turbine upon shutdown of the stop and throttle valves is substantially eliminated.

This is accomplished in accordance with my invention by the provision of means for removing leakage fluid from the conduit section between the stop and throttle valves upon shutdown of the turbine. This means is preferably in the form of a suction blower connected to said conduit section and automatically placed in operation upon closing of the stop and throttle valves.

For a better understanding of what I believe to be novel and my invention, attention is directed to the following description and the claims appended thereto in connection with the accompanying drawing.

The single figure of the drawing illustrates an elastic fluid turbine arrangement embodying my invention.

The arrangement comprises an elastic fluid turbine 10 with an inlet conduit 11 for conducting elastic fluid to the turbine. The flow of fluid is controlled by a throttle valve 12 and a stop valve 13 arranged ahead of the throttle valve 12 as regards the direction of flow of fluid therethrough. The throttle valve in the present example is controlled by a conventional speed-governing mechanism 14 including a speed governor 15 driven from the turbine shaft and connected to a governor and follow-up lever 16. The latter is connected to a pilot valve 17 for controlling the flow of operating fluid, such as oil, to a hydraulic motor 18 having a stem 19 with a piston 20 connected to the valve 12 and to the lefthand end of the lever 16. Piston 20 is biased to a position in which valve 12 is closed by its weight and by a spring 20a.

During operation an increase in speed due to decreasing load demand causes anti-clockwise turning movement of the lever 16 about its lefthand end whereby the heads of the pilot valve 17 are moved up to admit operating medium to the upper side of the piston 20, resulting in downward movement of the latter and closing movement of the valve 12. Downward movement of the piston 20 causes anti-clockwise turning movement of the lever 16 about its righthand end whereby the heads of the pilot valve are restored to their original position relative to the pilot valve ports. Upon decrease in speed the operation is similar except that the various elements move in the opposite direction to cause opening of the throttle valve 12 and thereby to increase the flow of elastic fluid to the turbine.

During normal operation the stop valve is in fully open position. Upon shutdown both the throttle valve and the stop valve are closed. Means are provided to prevent the flow of leakage fluid passing the stop valve from entering the turbine in case the throttle valve is also leaking. This means in the present embodiment comprises a suction blower 21 having an inlet conduit with a normally closed valve 22 connected to a section 23 of the conduit 11 between the stop and throttle valves. The blower 21 is driven by power agency, such as an electric motor 24, energized from a source of electricity 25 through a switch 26. Upon shutdown the motor 24 is started whereby the blower removes leakage steam from the conduit section 23. In case the turbine 10 has an exhaust end connected to a condenser under vacuum, the arrangement is preferably such that the vacuum created in the conduit section 23 is lower than that in the condenser.

In the present instance means are provided whereby the switch 26 is automatically closed and the valve 22 opened upon closing of the stop and throttle valves. This means includes a relay 27 for actuating the switch and an operating coil 28 for actuating the valve 22. The relay 27 has an operating coil 29 connected to the line 25 by a circuit including two contacts connected in series, a contact 30 in cooperative relation with an actuating member 31 secured to the valve stem 19 and another contact 32 in cooperative relation with an actuating member 33 secured to the stem of the stop valve 13. Upon closing of the two valves the contacts 30 and 32 are closed to close the circuit for the operating coil 29 and thereby to cause closing of the switch 26 against the force of a biasing spring 34. The operating coil 28 for the valve 22 is connected to an electric circuit which is also controlled by the aforementioned contacts 30 and 32. Upon closing of these contacts by the actuating members 31 and 33 respectively the coil 28 is energized and causes the valve 22 to move into its lefthand end or opening position against the biasing force of a spring 35 connecting the inlet of the blower to the conduit section 23.

When the turbine is shut down, the oil pressure to pilot valve 17 is cut off and valve 12 closes due to spring 20a and the weight of the ports. Valve 13 may be closed manually. Valves 12 and 13 are shown only diagrammatically. It will be understood that in actual practice any suitable valve arrangements may be used, the essential thing being that both valves are closed when the turbine is shut down.

Thus, with my arrangement, shutdown of the two valves 12 and 13 causes closing of electric circuits for operating the valve 22 to connect the inlet of the blower 21 to the conduit section 23 and for operating the switch to connect the drive motor 24 of the blower to a source of power.

What I claim as new and desire to secure by Letters Patent of the United States is:

1. Elastic fluid engine arrangement comprising an elastic fluid engine having an inlet conduit with two valves therein arranged in series as regards the flow of elastic fluid therethrough, means to prevent leakage of fluid into the engine after closing of the valves including a suction blower connected to the inlet conduit between the valves to remove fluid therefrom upon closing of the valves, and means responsive to closing of both valves for operating the suction blower.

2. Elastic fluid engine arrangement comprising an elastic fluid engine having an inlet conduit with two valves therein arranged in series as regards the flow of elastic fluid therethrough, and means to remove fluid from the conduit section between the valves upon closing of the valves, said means comprising a blower having an inlet conduit with a valve connected to said conduit section, a motor for driving the blower, and means for automatically opening the last-named valve and actuating said motor in response to closing of the engine valves.

3. Elastic fluid turbine arrangement comprising a turbine having an inlet conduit with a throttle valve and a stop valve arranged in series as regards the flow of fluid therethrough, a suction blower having an inlet conduit with an electrically actuated normally closed valve connected to the turbine inlet conduit between the stop and throttle valves, a motor for driving the blower, and means for automatically energizing the motor and opening the blower valve upon closing of the stop and throttle valves, said means including an electric circuit with a pair of contacts arranged to be closed upon closing of the throttle valve and another pair of contacts connected in series with the first mentioned pair and arranged to be closed upon closing of the stop valve.

4. Elastic fluid engine arrangement comprising an elastic fluid engine having an inlet conduit with two valves therein arranged in series as regards the flow of elastic fluid therethrough, and means to reduce the danger of corrosion within the engine by leakage fluid passing through the valves into the engine after the valves are closed, said means comprising a normally closed valved conduit connected to the inlet conduit between the valves and means for automatically opening the valved conduit in response to closing of both valves to drain fluid from the portion of the inlet conduit between the valves.

GLENN B. WARREN.